US010946626B2

(12) United States Patent
Huh et al.

(10) Patent No.: US 10,946,626 B2
(45) Date of Patent: Mar. 16, 2021

(54) COMPOSITE COMPRISING POLYESTER FOAM SHEET AND POLYESTER RESIN LAYER, AND VEHICLE INTERIOR AND EXTERIOR MATERIALS COMPRISING SAME

(71) Applicant: HUVIS CORPORATION, Seoul (KR)

(72) Inventors: Mee Huh, Daejeon (KR); Kwang Hee Lee, Daejeon (KR); Woo Jin Kim, Daejeon (KR); Seung Jun Lee, Jeollanam-do (KR)

(73) Assignee: HUVIS CORPORATION, Seoul (KR)

( * ) Notice: Subject to any disclaimer, the term of this patent is extended or adjusted under 35 U.S.C. 154(b) by 156 days.

(21) Appl. No.: 15/764,586

(22) PCT Filed: Jun. 30, 2016

(86) PCT No.: PCT/KR2016/007085
§ 371 (c)(1),
(2) Date: Mar. 29, 2018

(87) PCT Pub. No.: WO2017/057826
PCT Pub. Date: Apr. 6, 2017

(65) Prior Publication Data
US 2018/0297335 A1     Oct. 18, 2018

(30) Foreign Application Priority Data

Sep. 30, 2015 (KR) .................. 10-2015-0138204
Sep. 30, 2015 (KR) .................. 10-2015-0138206
(Continued)

(51) Int. Cl.
B32B 27/06       (2006.01)
B32B 27/08       (2006.01)
(Continued)

(52) U.S. Cl.
CPC .............. *B32B 27/065* (2013.01); *B32B 5/18* (2013.01); *B32B 5/245* (2013.01); *B32B 7/12* (2013.01);
(Continued)

(58) Field of Classification Search
CPC ..... B60R 13/02; B60R 13/0212; B60R 13/04; B32B 2262/0284; B32B 2367/00;
(Continued)

(56) References Cited

U.S. PATENT DOCUMENTS 4,554,206 A * 11/1985 Hilbert ............... C08G 63/6826
                                                              428/198
5,000,991 A    3/1991 Hayashi et al.
(Continued)

FOREIGN PATENT DOCUMENTS

EP      2881249 A1    6/2015
JP    H08246225 A     9/1996
(Continued)

OTHER PUBLICATIONS

International Search Report dated Oct. 18, 2016, from International Application No. PCT/KR2016/007085, 2 pages (non-English).
(Continued)

*Primary Examiner* — Alicia J Sawdon
(74) *Attorney, Agent, or Firm* — Meunier Carlin & Curfman LLC

(57) ABSTRACT

The present invention relates to a polyester composite comprising: a polyester foam sheet; and a polyester resin layer laminated on one surface or both surfaces of the polyester foam sheet. The durability and strength of the composite can be improved, the weight of the composite can be reduced, and the composite can be variously utilized as vehicle interior and exterior materials.

15 Claims, 1 Drawing Sheet

(30) Foreign Application Priority Data

| Dec. 8, 2015 | (KR) | .................. 10-2015-0174209 |
| Dec. 16, 2015 | (KR) | .................. 10-2015-0180284 |
| Apr. 29, 2016 | (KR) | .................. 10-2016-0052879 |
| Apr. 29, 2016 | (KR) | .................. 10-2016-0052897 |
| Apr. 29, 2016 | (KR) | .................. 10-2016-0053054 |

(51) Int. Cl.

| *B32B 5/24* | (2006.01) |
| *B32B 5/18* | (2006.01) |
| *B32B 27/36* | (2006.01) |
| *B60N 2/68* | (2006.01) |
| *C08J 5/12* | (2006.01) |
| *C08L 67/03* | (2006.01) |
| *B60N 2/30* | (2006.01) |
| *C08J 9/00* | (2006.01) |
| *B60R 13/02* | (2006.01) |
| *B32B 7/12* | (2006.01) |
| *B32B 27/12* | (2006.01) |
| *B60R 13/04* | (2006.01) |

(52) U.S. Cl.
CPC .............. *B32B 27/06* (2013.01); *B32B 27/08* (2013.01); *B32B 27/12* (2013.01); *B32B 27/36* (2013.01); *B60N 2/30* (2013.01); *B60N 2/68* (2013.01); *B60R 13/02* (2013.01); *B60R 13/0212* (2013.01); *B60R 13/04* (2013.01); *C08J 5/12* (2013.01); *C08J 9/00* (2013.01); *C08L 67/03* (2013.01); *B32B 2262/0276* (2013.01); *B32B 2262/0284* (2013.01); *B32B 2266/0264* (2013.01); *B32B 2305/022* (2013.01); *B32B 2307/102* (2013.01); *B32B 2307/518* (2013.01); *B32B 2307/546* (2013.01); *B32B 2307/718* (2013.01); *B32B 2307/732* (2013.01); *B32B 2367/00* (2013.01); *B32B 2605/00* (2013.01); *B32B 2605/003* (2013.01)

(58) Field of Classification Search
CPC .......... B32B 2307/546; B32B 2605/00; B32B 2605/003; B60N 2/30; B60N 2/68
See application file for complete search history.

(56) References Cited

U.S. PATENT DOCUMENTS

| 2002/0012785 | A1* | 1/2002 | Leduc | .................. B32B 5/18 428/316.6 |
| 2013/0011657 | A1* | 1/2013 | Kato | .................. C08J 9/0061 428/317.3 |
| 2014/0349094 | A1* | 11/2014 | Jonza | .................. B32B 5/18 428/215 |

FOREIGN PATENT DOCUMENTS

| JP | 2001-001436 | 1/2001 |
| JP | 2004-106409 | 4/2004 |
| JP | 2004-330711 | 11/2004 |
| JP | 2004330711 A * | 11/2004 |
| JP | 2005120250 A | 5/2005 |
| JP | 2009-113371 | 5/2009 |
| JP | 2009113371 A * | 5/2009 |
| JP | 2009-234261 | 10/2009 |
| JP | 2011090042 A | 5/2011 |
| JP | 2012-106578 | 6/2012 |
| JP | 2012171094 A | 9/2012 |
| JP | 2013-126790 | 6/2013 |
| JP | 2013-209777 | 10/2013 |
| JP | 5825800 | 12/2015 |
| KR | 10-1997-0033798 | 7/1997 |
| KR | 10-0178523 | 5/1999 |
| KR | 10-2000-0077235 | 12/2000 |
| KR | 10-0363291 | 5/2003 |
| KR | 10-2008-0027177 | 3/2008 |
| KR | 10-2011-0034522 | 4/2011 |
| KR | 10-2011-0082484 | 7/2011 |
| KR | 10-2012-0058347 | 6/2012 |
| KR | 10-2013-0120567 | 11/2013 |
| KR | 10-1387465 | 4/2014 |
| KR | 101387465 B1 * | 4/2014 |
| KR | 10-2014-0103207 | 8/2014 |
| KR | 10-2016-0036191 | 4/2016 |
| WO | 2013085773 A1 | 6/2013 |

OTHER PUBLICATIONS

European Search Report and Search Opinion issued by the European Patent Office in Application No. 16851974.2 dated Feb. 20, 2019. 7 pages.

European Search Report and Search Opinion issued by the European Patent Office in Application No. 16851975.9, dated Mar. 11, 2019. 8 pages.

Office Action issued by the Japanese Patent Office in Application No. 2018-516547 dated May 7, 2019. 8 pages.

* cited by examiner

[Figure 1]
100
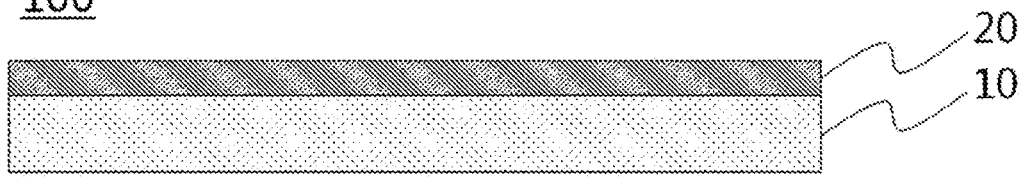
[Figure 2]
200
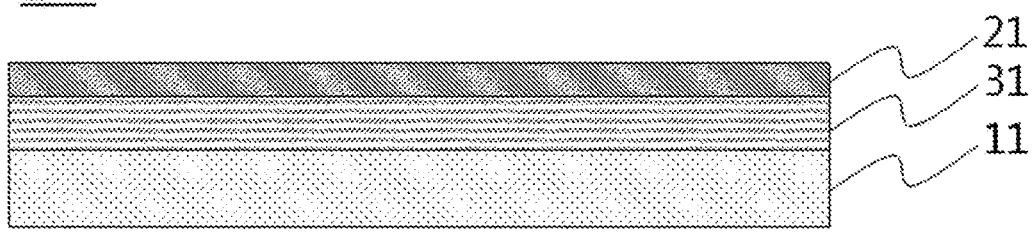
[Figure 3]
300
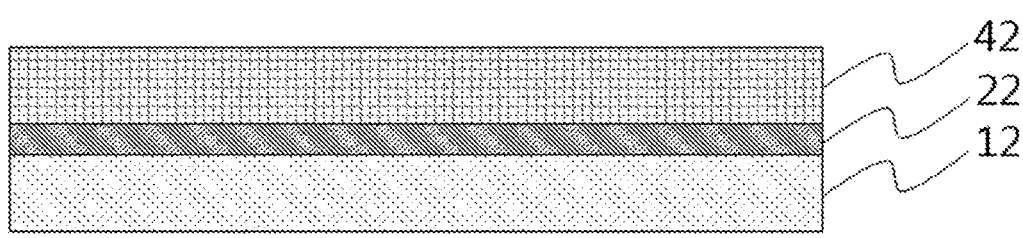
[Figure 4]
400
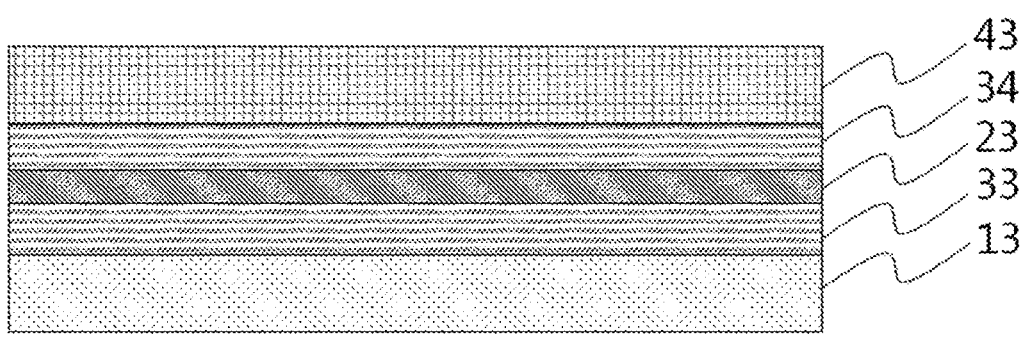

COMPOSITE COMPRISING POLYESTER FOAM SHEET AND POLYESTER RESIN LAYER, AND VEHICLE INTERIOR AND EXTERIOR MATERIALS COMPRISING SAME

TECHNICAL FIELD

The present invention relates to a polyester foam sheet, a composite including a polyester resin layer, and vehicle interior or exterior materials including the same.

BACKGROUND ART

There is a need for the development of useful materials which can satisfy physical properties such as lightweightness and durability at the same time in various industrial fields such as buildings, automobiles, and foods.

Among them, in the automobile industry, a lot of efforts have been made to reduce the weight of the automobile in order to reduce the fuel consumption of the automobile. For example, various attempts have been made to lighten various interior or exterior materials forming the automobile, and at the same time, efforts have been made to reduce manufacturing costs by processability and process improvements of interior or exterior materials.

Conventionally, as a method for improving durability and strength of vehicle interior or exterior materials, a sheet formed by mixing polyurethane (PU) and glass fiber has been used, or a low weight reinforced thermoplastic (LWRT), which is a sheet-type material formed by mixing polypropylene (PP) and glass fiber, has mainly been used.

However, in the case of a material including glass fiber as described above, there is a problem in that a large amount of dust due to glass fiber is generated during work operations, thereby deteriorating the health of the worker and a work environment. Further, when scraps are generated, the material cannot be recycled due to a combination with other materials and should be discarded.

Accordingly, there is an urgent need to develop a composite which can solve problems of dust generation during operation by not mixing glass fiber, can be recycled, and has improved durability, strength, and is lightweight.

DISCLOSURE

Technical Problem

It is an object of the present invention to provide a composite which can improve a working environment, has improved durability and strength, and is lightweight.

Technical Solution

In order to achieve the object, the present invention provides a polyester composite including: a polyester foam sheet; and a polyester resin layer laminated on one surface or both surfaces of the polyester foam sheet.

Further, the present invention provides a vehicle interior or exterior material including the polyester composite.

Advantageous Effects

The composite according to the present invention can improve a working environment, provide a composite having improved durability and strength and lightweightness. Further, the composite according to the present invention is easily reused, and can have a variety of uses such as vehicle interior or exterior materials.

DESCRIPTION OF DRAWINGS

FIGS. 1 to 4 each are cross-sectional views of a polyester composite according to an embodiment of the present invention.

BEST MODE OF THE INVENTION

As embodiments allow for various changes and numerous embodiments, exemplary embodiments will be illustrated in the drawings and described in detail in the written description. However, this is not intended to limit embodiments to particular modes of practice, and it is to be appreciated that all changes, equivalents, and substitutes that do not depart from the spirit and technical scope of embodiments are encompassed in the embodiments. In the description of embodiments certain detailed explanations of the related art are omitted when it is deemed that they may unnecessarily obscure the essence of the inventive concept.

While such terms as "first," "second," etc., may be used to describe various components, such components must not be limited to the above terms. The above terms are used only to distinguish one component from another.

The terminology used herein to describe embodiments of the invention is not intended to limit the scope of the invention. As used herein, the singular forms "a," "an" and "the" are intended to include the plural forms as well, unless the context clearly indicates otherwise.

It will be further understood that the terms "comprises" and/or "comprising," when used in the present invention, specify the presence of stated features, integers, steps, operations, elements, and/or combinations thereof, but do not preclude the presence or addition of one or more other features, integers, steps, operations, elements, components, and/or combinations thereof.

Therefore, since the embodiments described in this specification and configurations illustrated in drawings are only exemplary embodiments and do not represent the overall technological scope of the invention, it is understood that the invention covers various equivalents, modifications, and substitutions at the time of filing of this application.

The present invention relates to a composite in which a polyester foam and a polyester film are combined. Specifically, the polyester foam may be a foam sheet foamed in the form of a sheet, and the polyester resin film may be a biaxially oriented film.

As an example, the composite according to the present invention includes: a polyester foam sheet; and a polyester resin layer laminated on one surface or both surfaces of the polyester foam sheet.

The composite according to the present invention has a flexural modulus (or stiffness) of 400 MPa or more. The inventors of the present invention found that an excellent flexural modulus can be achieved by laminating a polyester foam sheet and a polyester resin layer. Specifically, the flexural modulus was evaluated according to ASTM D 790, and more specifically, is a value which is measured when a specimen is fixed with a 100 mm support span and a flexural load is applied thereto at a rate of 5 mm/min. Specifically, the flexural modulus of the composite may be 400 MPa or more, 450 Mpa or more, 500 to 30,000 Mpa, 550 to 25,000 Mpa, 600 to 20,000 Mpa, 650 to 10,000 Mpa, 700 to 5,000 Mpa, 750 to 4,000 Mpa, 800 to 3,000 Mpa, or 860 to 1,000

Mpa. The composite according to the present invention can secure excellent rigidity and prevent the deformation caused by physical impact or force by controlling the flexural modulus to be in the above-described range.

Further, the composite according to the present invention has a structure in which the polyester foam sheet and the polyester resin layer are laminated, and thus can be easily recycled. In order to recycle scraps remaining after a molding process, and materials used for automobile interior or exterior materials in the process of scrapping cars or the like, decomposition and separation processes for each component are required, and thus most of the scraps and materials are disposed of, and the costs for disposing thereof are separately generated. However, in the composite according to the present invention, the foam sheet and the resin layer are both formed of polyester materials, and thus it is not necessary to separate each layer and the composite may be melted at once to be recycled.

Further, the composite according to the present invention does not contain glass fibers. Since the composite laminate used in the conventional automobile industry contains glass fibers, there is a problem that dust caused by glass fibers is generated during processing. The composite according to the present invention does not contain glass fiber, and thus can be lightened and can prevent the generation of glass dust generated during processing. Further, the present invention provides a composite having excellent rigidity, strength, and durability. In the present invention, the "glass fiber is not contained" means that, for example, the content of the glass fiber is 1 wt % or less, 0.01 wt % or less, 1 to 0.001 wt %, or 0.01 to 0.001 wt % based on the weight of the total composite, and specifically, means that the glass fiber is substantially not contained.

As an example, the composite according to the present invention may have a structure in which the polyester resin foam sheet and the polyester resin layer are bonded without a separate adhesive material. For example, the polyester resin foam sheet and the polyester resin layer may be bonded by thermal fusion or thermal bonding.

As another example, the polyester composite according to the present invention may have a structure in which the foam sheet and the resin layer are bonded with an adhesive layer interposed therebetween. For example, the adhesive layer may include a polyester-based adhesive resin layer interposed between the polyester foam sheet and the polyester resin layer.

The polyester-based adhesive resin layer may be prepared into various types of extrudates and film moldings. Further, the polyester-based adhesive resin layer according to the present invention may be prepared into a web. The polyester-based adhesive resin layer according to the present invention may be provided as a nonwoven fabric of a film or a web structure by pressing in multiple layers due to having a low melting point. The polyester composite according to the present invention may be prepared by interposing the polyester-based adhesive resin layer between the foam sheet and the resin layer, and then pressing with a pressure roller, or heat bonding with heat.

Specifically, the polyester-based adhesive resin layer may be a polyester-based elastic adhesive resin which is a condensation-polymerization product of a soft segment, which is a polyol, and a hard segment, which is an esterification reaction product of a diol and a dicarbonic acid.

Specifically, the diol may include ethylene glycol (EG) or a mixture of ethylene glycol (EG) and 2-methyl 1,3-propanediol (MPO), and the dicarbonic acid may include terephthalic acid (TPA), or a mixture of terephthalic acid (TPA) and an anhydride resin.

The diol may include 1,4-butanediol (1,4-BD) or a mixture of 1,4-butanediol (1,4-BD) and 2-methyl 1,3-propanediol (MPO), and the dicarbonic acid may include dimethyl terephthalate (DMT) or a mixture of dimethyl terephthalate (DMT) and an anhydride resin.

The polyol may include one or more of poly(tetramethylene ether) glycol (PTMG), polyethylene glycol (PEG), and polypropylene glycol (PPG).

The anhydride resin may be one or more of methyl tetrahydrophthalic anhydride (MeTHPA), methylhexahydrophthalic anhydride (MeHHPA), tetrahydrophthalic anhydride (THPA) and hexahydrophthalic anhydride (HHPA).

The molar ratio of the mixture of the terephthalic acid (TPA) and the anhydride resin may be 40 to 99:60 to 1.

The molar ratio of the mixture of the dimethyl terephthalate (DMT) and the anhydride resin may be 40 to 99:60 to 1.

As an example, the polyester composite according to the present invention may have an average thickness in the range of 1.1 to 5.2 mm. Specifically, the composite may have a thickness in the range of 1.3 to 5 mm, 1.5 to 4.8 mm, 2 to 4.6 mm, 2.4 to 4.4 mm, 2.8 to 4.2 mm, 3 to 4.1 mm or 3.5 to 4 mm. When the average thickness of the composite according to the present invention is within the above-described range, it is possible to prevent a decrease in strength and rigidity while realizing weight reduction.

As another example, an average thickness of the polyester resin layer according to the present invention may be in the range of 60 to 350 μm, 90 to 340 μm, 100 to 330 μm, 120 to 320 μm, 130 to 310 μm, 150 to 300 μm, 180 to 280 μm, 200 to 270 μm, or may be 250 μm. When the average thickness of the resin layer is within the above-described range, the flexural modulus of the composite is increased, and thus significantly improved rigidity can be realized.

As an example, the polyester composite according to the present invention may have a flexural strength of 20 $N/cm^2$ or more measured according to ASTM D 790. The flexural strength may be evaluated in accordance with ASTM D 790, and may be, for example, a value measured when a specimen is fixed with a 100 mm support span and a flexural load is applied thereto at a rate of 5 mm/min. Specifically, the flexural strength may be in the range of 22 to 250 $N/cm^2$, 25 to 210 $N/cm^2$, 30 to 200 $N/cm^2$, or 50 to 180 $N/cm^2$. The composite according to the present invention can achieve an excellent flexural modulus while satisfying the flexural strength ranges above, even though the composite is not thick.

As an example, an average basis weight of the polyester foam sheet according to the present invention may be in the range of 300 to 3,000 $g/m^2$. Specifically the average basis weight may be in the range of 350 to 2,500 $g/m^2$, 380 to 2,000 $g/m^2$, 400 to 1,500 $g/m^2$, 430 to 1,000 $g/m^2$, 450 to 950 $g/m^2$, 480 to 900 $g/m^2$, 500 to 850 $g/m^2$, 530 to 800 $g/m^2$ or 550 to 750 $g/m^2$. Further, an average basis weight of the polyester composite according to the present invention may be in the range of 350 to 3,500 $g/m^2$, 400 to 3,000 $g/m^2$, 450 to 2,500 $g/m^2$, 480 to 2,000 $g/m^2$, 500 to 1,500 $g/m^2$, 520 to 1,000 $g/m^2$ or 550 to 900 $g/m^2$.

When the average basis weight of the foam sheet and composite according to the present invention is within the above-described range, it is possible to realize an improved flexural strength and flexural modulus while satisfying lightweightness, thereby facilitating transportation and construction when working with construction materials or automobile materials.

As an example, an average thickness of the polyester foam sheet according to the present invention may be in the range of 1 to 5 mm. Specifically, an average thickness of the polyester foam sheet may be in the range of 1.3 to 4.5 mm, 1.5 to 4 mm, 1.8 to 3.5 mm, 2 to 3 mm or 2 to 2.5 mm. When the thickness of the polyester foam sheet according to the present invention is within the above-described range, it is possible to realize improved strength and rigidity while satisfying the weight reduction of the composite.

As an example, the polyester foam sheet according to the present invention may have a flexural strength of 10 N or more measured according to ASTM D 790. The flexural strength may be evaluated in accordance with ASTM D 790, and may be, for example, a value measured when a specimen is fixed with a 100 mm support span and a flexural load is applied thereto at a rate of 5 mm/min. Specifically, the flexural strength may be in the range of 15 to 200 N, 20 to 180 N, or 25 to 150 N. The polyester foam sheet according to the present invention can satisfy an improved flexural strength even though the polyester foam sheet is not thick, thereby satisfying both lightweightness and strength.

As an example, the polyester foam sheet according to the present invention may be a polyethylene terephthalate (PET) foam sheet, and the polyester resin layer may be a polyethylene terephthalate resin layer. The polyester composite according to the present invention may have the polyester foam sheet and the polyester resin layer formed of the same components, and thereby interlayer adhesiveness may be improved, peeling may be prevented, and further, recycling becomes easy.

The polyester resin mainly used thus far is a high molecular weight aromatic polyester resin produced by a condensation polymerization reaction of terephthalic acid and 1,4-butanediol. Here, the high molecular weight polyester may refer to a polymer having a limiting viscosity of 0.8 (dL/g) or more. The aromatic polyester resin has excellent physical properties such as a high molecular weight, thermal stability, tensile strength, and the like, but does not decompose and remains in the natural ecosystem for a long time after disposal, causing serious environmental pollution problems.

Specific examples of the type of the polyester usable in the present invention include one or more selected from the group consisting of polyethylene terephthalate (PET), polybutylene terephthalate (PBT), polylactic acid (PLA), polyglycolic acid (PGA), polypropylene (PP), polyethylene (PE), polyethylene adipate (PEA), polyhydroxyalkanoate (PHA), polytrimethylene terephthalate (PTT), and polyethylene naphthalate (PEN).

Specifically, in the present invention, polyethylene terephthalate (PET) may be used as the polyester.

In the polyester foam sheet according to the present invention, 90% or more of cells are closed cells (DIN ISO4590), which means that the quantity of closed cells among cells of the polyester foam sheet measured according to DIN ISO 4590 is that 90% (v/v) or more of the cells. For example, the average ratio of closed cells in the polyester foam may be in the range of 90 to 100% or 95 to 99%. When the polyester foam sheet according to the present invention has closed cells within the above-mentioned range, excellent durability, rigidity, and strength characteristics can be realized in the production of the composite. For example, the number of cells of the polyester foam sheet may include 1 to 30 cells, 3 to 25 cells, or 3 to 20 cells per 1 $mm^2$.

Further, the average size of the cells may be in the range of 100 to 800 μm. For example, the average size of the cells may be in the range of 100 to 700 μm, 200 to 600 μm, or 300 to 600 μm. Here, a variation in cell size may be, for example, 5% or less, 0.1 to 5%, 0.1 to 4% or 0.1 to 3%. Accordingly, it can be seen that the polyester foam sheet according to the present invention has uniformly foamed cells having a uniform size.

As an example, the polyester foam sheet according to the present invention may be an extrusion foam molded article. Specifically, the types of foaming methods include bead foaming and extrusion foaming Bead foaming is generally a method of heating a resin bead to form a primary foaming product, aging the product for a suitable period of time, filling a plate-shaped or cylindrical mold with the product, heating it again, and fusing and molding the product by secondary foaming. On the other hand, extrusion foaming is a method of heating and melting the resin and continuously extruding and foaming the resin melt, which can simplify the process steps, enable mass-production, and prevent cracks between the beads and granular fractures which occur during bead foaming, thereby realizing superior flexural strength and compressive strength.

As an example, the polyester resin layer according to the present invention may be one or more of a biaxially oriented polyester film, a polyester amorphous film, and a polyester coating layer. Specifically, the polyester resin layer may be a biaxially oriented polyester film. More specifically, the polyester resin layer may be a biaxially oriented polyethylene terephthalate film.

As an example, the biaxially oriented polyester film according to the present invention may be stretched 2 to 8-fold in a longitudinal direction (machine direction=MD) and 1.1 to 6-fold in a transverse direction (perpendicular to the machine direction=TD), and may have a total draw ratio of 1.5 to 7-fold.

Specifically, the biaxially oriented polyester film according to the present invention may be prepared by stretching an unstretched polyester film in the longitudinal direction (machine direction=MD) at a temperature range of about 90 to 120° C. to about 2 to 8-fold and stretching the film in the transverse direction (perpendicular to the machine direction=TD) at a temperature range of about 100 to 140° C. to about 1.1 to 6-fold, and then heat-treating the film at a temperature range of about 220 to 240° C. When the biaxially oriented film is used, excellent durability, rigidity, and strength can be realized without increasing the thickness of the composite according to the present invention, and the weight of the composite can be reduced to facilitate construction.

As an example, the polyester composite according to the present invention may have a structure in which the polyester resin layer and a polyester fiber layer are sequentially stacked on one surface or both surfaces of the polyester foam sheet.

As another example, the polyester foam sheet may be a polyethylene terephthalate (PET) foam sheet, the polyester resin layer may be a polyethylene terephthalate resin layer, and the polyester fiber layer may include polyethylene terephthalate fibers.

The composite according to the present invention may have a structure in which the polyester foam sheet; the polyester resin layer; and the polyester fiber layer are sequentially stacked and bonded by thermal fusion or thermal bonding without a separate adhesive material. Further, the polyester composite according to the present invention may have a structure in which the foam sheet and the resin layer are bonded with the adhesive material interposed therebetween, or the resin layer and the polyester fiber layer are bonded with the adhesive material interposed therebetween.

As an example, a polyester-based adhesive resin layer, which is formed at one or more positions of between the polyester foam sheet and the polyester resin layer and between the polyester resin layer and the polyester fiber layer, may be further included. The polyester-based adhesive resin layer may be a polyester-based elastic adhesive resin which is a condensation-polymerization product of a soft segment, which is a polyol, and a hard segment, which is an esterification reaction product of a diol and a dicarbonic acid.

Specifically, when the composite of the present invention further includes a polyester-based adhesive resin layer between the polyester foam sheet and the polyester resin layer, and/or between the polyester resin layer and the polyester fiber layer, the composite may be a polyester composite in which a polyester foam sheet; a first polyester-based adhesive resin layer; a polyester resin layer; a second polyester adhesive resin layer; and a polyester fiber layer are sequentially stacked. The polyester composite according to the present invention having such a structure may have each layer formed of the same components, and thereby interlayer adhesiveness may be improved, peeling may be prevented, and further, recycling becomes easy.

As an example, the polyester fiber layer may be formed of an aggregate of modified cross-section hollow fibers. The modified cross-section hollow fiber may have a hollow part, a shape maintaining part, and a volume control part on the basis of a cross-sectional shape, in which the volume control part may have a shape which protrudes in a direction opposite to a center of a fiber in which an end part has a round shape.

Specifically, the volume control part may have a shape which protrudes in a direction opposite to a center of a fiber, and more specifically, the end part having a protruding shape may have a round shape.

In the present invention, the cross-sectional structure of the modified cross-section hollow fiber is described as a hollow part, a shape maintaining part, and a volume control part, but this is for convenience of explanation. The cross-sectional structure of the modified cross-section hollow fiber includes a hollow part forming a hole therein along the longitudinal direction of the fiber, and a shape maintaining part surrounding the hollow part.

Further, the shape maintaining part has a concavo-convex portion formed on the outer circumferential surface on the opposite side of the hollow part on the basis of a cross-sectional shape, and a protruding portion in the concavo-convex portion is referred to as a volume control part.

Specifically, a polyester resin may be used as the modified cross-section hollow fiber, and for example, polyethylene terephthalate (PET) may be used. A melt viscosity of the melt-spun PET polymer may range from 0.60 to 0.64, and an in-out type radiation cylinder capable of maximizing a cooling effect is suitable. A thickness of the fiber may be varied from 4 to 15 denier, and a fiber length may be in the range of 22 to 64 mm.

A hollow rate of the hollow part may range from about 15 to 30% of the total area of the fiber. When the hollow rate exceeds the above-described range, there may be a problem with fiber formability. When the hollow rate is less than the above-described range, a hollowness retention property and various functionalities of the present invention may be limited. The shape maintaining part refers to a fibrous shape between the hollow part and the volume control part.

The volume control part may have a shape which protrudes in a direction opposite to a center of a fiber in which an end part has a round shape. Here, the uppermost portion of the end part may be defined as a peak, and the space between the volume control parts may be defined as a valley. Here, the radius of curvature of the peak may be defined as R, the radius of curvature of the valley may be defined as r, and R and r values may be identical or different for each volume control part.

As an example, the present invention provides a vehicle interior or exterior material including the polyester composite.

The vehicle interior or exterior material may be one or more of a head liner, a flow under cover, an engine room cover, a trunk room panel, a package tray, a seatback and a bumper.

As an example, the head liner according to the present invention may be a head liner panel mounted on an inner side of a roof panel of an automobile, and the head liner panel including the vehicle interior or exterior material according to the present invention may satisfy the following Condition 1.

$$((Lt_1-Lt_0)/Lt_0) \times 100 < 1 (\%)$$ [Condition 1]

Condition 1 represents a dimensional (an average value of a width, a length, and a height) change rate measured, according to an accelerated light-resistance test of KS R 0021, before and after being irradiated with light of a wavelength of 300 to 400 nm at an irradiance of 255 W/m$^2$ for 90 days, and $Lt_0$ represents the dimension before treatment and $Lt_1$ represents the dimension after treatment.

Specifically, in Condition 1, a dimensional change rate may be less than 1% and in the range of 0.01 to 0.9%, 0.05 to 0.8%, or 0.1 to 0.6%. Here, t dimensional change rate may be a dimensional change rate when the volume ($Tt_0$) before treatment (before light irradiation) is 1 m$^3$. When the dimensional change rate of the head liner panel according to the present invention satisfies the above-described range, improved durability and light resistance can be imparted, and the deformation and damage caused by ultraviolet rays can be prevented even during long-term use.

As another example, the flow under cover may have a flexural strength (N) in the range of 100 to 500 N which is measured when a specimen is fixed with a 100 mm support span and a flexural load is applied thereto at a rate of 5 mm/min according to ASTM D 790. For example, the flexural strength may be in the range of 150 to 500 N, 200 to 500 N or 300 to 500 N. When the flexural strength of the flow under cover according to the present invention satisfies the above-described range, it may be safer against external impact due to high strength.

The flow under cover is mounted on a bottom surface of a vehicle, and is installed at the bottom of an engine, a transmission, and a cooling fan or the like to protect the engine and the transmission from external impacts. In addition, it may prevent the noise generated from the engine or transmission during driving from being emitted to the outside and prevent foreign matter from entering an automobile from the outside. The flow under cover including the polyester composite according to the present invention can effectively protect the engine and the transmission from externally applied impacts, can satisfy physical properties such as excellent flame retardancy, strength, sound absorption and sound insulation properties and the like, and is lightweight, and thus it is also effective in reducing fuel consumption of automobiles.

As another example, the engine room cover according to the present invention may have a combustibility of 50 mm/min or less based on ISO 3795: 1989. Specifically, the combustibility may be measured by preparing a 100 mm (width)×350 mm (length) test specimen, allowing the flame of the combustion test device to contact the one end of the specimen for 15 seconds, removing the flame, and calculating a combustion speed according to the following Equation 1.

$$B=D/T\times 60 \quad \text{[Equation 1]}$$

In Equation 1, B represents a combustion speed (mm/min), D represents a combustion length (mm), and T represents a combustion time (seconds).

As another example, the trunk room panel according to the present invention may have a flexural modulus in the range of 400 to 30,000 MPa which is measured when a specimen is fixed with a 100 mm support span and a flexural load is applied thereto at a rate of 5 mm/min according to ASTM D 790. In the present invention, the trunk room panel refers to a panel which separates a riding area and a trunk area in a vehicle, and specifically, the flexural modulus of the trunk room panel may be in the range of 500 to 30,000 Mpa, 550 to 25,000 Mpa, 600 to 20,000 Mpa, 650 to 10,000 Mpa, 700 to 5,000 Mpa, 750 to 4,000 Mpa, 800 to 3,000 Mpa or 860 to 1,000 Mpa. Accordingly, it is possible to satisfy further improved rigidity. Stiffness refers to the degree of hardness or rigidity of the material. When the flexural modulus satisfies the above-described range, a trunk room panel which is less deformed by physical impact or force due to having improved rigidity and durability can be provided.

As another example, the package tray according to the present invention may have an absorption amount of 2% or less measured according to ASTM D 570. Here, the package tray panel is installed behind a rear seat. Specifically, the package tray panel is a vehicle interior or exterior material which supports a rear seat, allows the rider on the rear seat to store various parts and documents, and is equipped with functional parts such as a speaker and a fragrance as required. Excellent durability and moisture resistance are required for the package tray panel. Specifically the absorption amount of the package tray may be 1.8 g/100 cm$^2$ or less, 1.5 g/100 cm$^2$ or less, 1 g/100 cm$^2$ or less, 0.01 to 0.5 g/100 cm$^2$ or 0.1 to 0.4 g/100 cm$^2$. When the absorption amount of the package tray panel according to the present invention satisfies the above-described range, moisture resistance is improved to facilitate storing of the panel outside, and moisture resistance and strength can be prevented from being lowered even when the panel is used for a long period of time.

FIGS. 1 to 4 each schematically show the cross-sectional structure of the polyester composite according to the present invention.

FIG. 1 is a cross-sectional view of a polyester composite 100 having a structure in which a polyester resin layer 20 is bonded to a polyester foam sheet 10. The polyester resin foam sheet 10 and the polyester resin layer 20 are thermally fused or thermally bonded without an adhesive layer interposed therebetween.

The polyester foam 200 shown in FIG. 2 has a structure in which a polyester foam sheet 11, a polyester-based adhesive resin layer 31 and a polyester resin layer 21 are sequentially bonded.

The polyester foam 300 shown in FIG. 3 has a structure in which a polyester foam sheet 12, a polyester resin layer 22 and a polyester scrim 42 are thermally fused.

Further, the polyester foam 400 shown in FIG. 4 has a structure in which a polyester foam sheet 13, a first polyester-based adhesive resin layer 33; a polyester resin layer 23; a second polyester adhesive resin layer 34; and a polyester scrim 43 are sequentially stacked. The package tray panel of the present invention having such a structure can realize enhanced strength and durability while preventing an overall thickness from becoming thick.

[Mode of the Invention]

Hereinafter, the present invention will be further described in detail with reference to examples and comparative examples, but the scope of the present invention is not limited thereto.

Example 1

Preparation of Polyester Composite

First, in order to prepare the polyester composite according to the present invention, 100 parts by weight of a polyethylene terephthalate (PET) resin was dried at 130° C. to remove moisture. The PET resin from which the moisture was removed, and 1 part by weight of pyromellitic dianhydride (PMDA), 1 part by weight of talc, and 0.1 part by weight of Irganox (IRG 1010) based on 100 parts by weight of the PET resin from which the moisture was removed were mixed in a first extruder and heated to 280° C. to prepare a resin melt. Next, 5 parts by weight of a gas mixture, in which carbonic acid gas and pentane were mixed in a ratio of 5:5, as a foaming agent based on 100 parts by weight of the PET resin was introduced into the first extruder, and the resin melt was extruded and foamed to prepare a polyester foam sheet. The polyester foam sheet thus prepared had a density of about 300 kg/m$^3$, a thickness of about 2 mm, and a basis weight of about 600 g/m$^2$.

Then, a biaxially oriented polyester film having a longitudinal elongation rate of 3-fold, a transverse elongation rate of 1.5-fold, and a thickness of 250 μm was heat-treated under conditions of a pressure of 3 kgf and a temperature of 250° C. for 5 seconds to form a polyester composite. The polyester composite finally prepared had a thickness of about 3.9 mm and a basis weight of 750 g/m$^2$.

FIG. 1 is a cross-sectional view of the polyester composite 100 in which the biaxially oriented polyester film 20 is thermally fused onto the polyester foam sheet 10.

Example 2

Preparation of Polyester Composite

A composite was prepared by sequentially stacking a PET foam sheet, a PET adhesive layer and a biaxially oriented PET film. The PET foam sheet and the biaxially oriented PET film are the same as those described in Example 1.

Example 3

Preparation of Polyester Composite

A composite was prepared in the same manner as in Example 2 except that biaxially oriented PET films were laminated on both surfaces of the PET foam sheet.

Example 4

Preparation of Polyester Composite

A composite was prepared by sequentially stacking a PET foam sheet, a PET adhesive layer, a biaxially oriented PET film, a PET adhesive layer and a nonwoven fabric layer formed of PET fibers. The PET foam sheet and the biaxially oriented PET film are the same as those described in Example 1.

Comparative Example 1

Polypropylene Composite Containing Glass Fibers

A glass fiber mat thermoplastic (GMT) was prepared by impregnating 40 parts by weight of a glass fiber mat laminated with four layers with 60 parts by weight of polypropylene.

Comparative Example 2

Foam Sheet Without Biaxially Oriented Film

A polyester foam sheet was prepared in the same manner as in Example 1 except that the biaxially oriented film was not bonded.

Comparative Example 3

Composite with Biaxially Oriented Film Having Reduced Thickness

A polyester composite was prepared in the same manner as in Example 1 except that the thickness of the bonded biaxially oriented film was about 50 μm.

Comparative Example 4

Composite with Foam Sheet Having Reduced Basis Weight

A composite was prepared in the same manner as in Example 1, except that the polyester foam sheet had a density of about 140 kg/m$^3$ and a basis weight of about 280 g/m$^2$.

Comparative Example 5

Composite with Biaxially Oriented Film Having Reduced Thickness and Foam Sheet Having Reduced Basis Weight A composite was prepared in the same manner as in Example 1, except that the polyester foam sheet had a density of about 140 kg/m$^3$, a basis weight of about 280 g/m$^2$, and a thickness of about 50 μm.

Example 1 and Comparative Examples 1 to 5 prepared by the above-described process are summarized in the following Table 1.

TABLE 1

| Classification | Example 1 | Comparative Example 1 | Comparative Example 2 | Comparative Example 3 | Comparative Example 4 | Comparative Example 5 |
|---|---|---|---|---|---|---|
| Density of foam sheet (kg/m$^3$) | 300 | 450 | 300 | 300 | 140 | 140 |
| Thickness of foam sheet (mm) | 2 | 3.1 | 2 | 2 | 2 | 2 |
| Basis weight of foam sheet (g/m$^2$) | 600 | 900 | 600 | 600 | 280 | 280 |
| Thickness of biaxially oriented film (μm) | 250 | — | — | 50 | 250 | 50 |

EXPERIMENTAL EXAMPLE

In order to evaluate the physical properties of Example 1 and Comparative Examples 1 to 5, flexural modulus (stiffness) and flexural strength were measured.

Flexural modulus and flexural strength were measured when a specimen was fixed with a 100 mm support span and a flexural load was applied thereto at a rate of 5 mm/min according to ASTM D 790. The results are shown in the following Table 2.

TABLE 2

| Classification | Example 1 | Comparative Example 1 | Comparative Example 2 | Comparative Example 3 | Comparative Example 4 | Comparative Example 5 |
|---|---|---|---|---|---|---|
| Flexural modulus (Mpa) | 890 | 850 | 285 | 350 | 310 | 138 |

TABLE 2-continued

| Classification | Example 1 | Comparative Example 1 | Comparative Example 2 | Comparative Example 3 | Comparative Example 4 | Comparative Example 5 |
|---|---|---|---|---|---|---|
| Flexural strength (N) | 200 | 120 | 180 | 190 | 130 | 110 |

Referring to Table 2, it can be confirmed that the polyester composite according to Example 1 was obtained by appropriately controlling the density and basis weight of the polyester foam sheet and optimizing the thickness of the biaxially oriented polyester film, so that a flexural modulus was about 890 MPa, which was significant improved compared to Comparative Examples 1 to 5, and a flexural strength was about 200 N, which was the highest.

On the other hand, in the case of Comparative Example 1, which is a GMT formed by combining polypropylene with glass fiber, the flexural modulus and flexural strength were lower than those of Example 1 of the present invention, and since the glass fiber is contained, dust may be generated due to the glass fiber when a worker works, which may damage the health of the worker.

In the case of Comparative Example 2, a biaxially oriented film was not bonded, and thus the flexural modulus was significantly lower than that of Example 1. In the case of Comparative Example 3, although the flexural strength was relatively high, a flexural modulus, which plays an important role in improving durability, was very low because the thickness of the biaxially oriented film was reduced. In the cases of Comparative Examples 4 and 5 in which the basis weight of the foam sheet and the thickness of the biaxially oriented film were reduced, both the flexural modulus and the flexural strength were low.

Therefore, by suitably adjusting the basis weight of the polyester foam sheet and by compounding the biaxially oriented film to a suitable thickness, it was found that the polyester composite according to the present invention had significantly improved flexural modulus and flexural strength even though glass fiber was not used. Further, since glass fiber is not contained, workers can avoid harm caused by the generation of dust when working with the composite. Further, in the composite according to the present invention, all of the foam sheet, the elastic adhesive resin and the composite are formed of polyester, and thus recycling is easy.

INDUSTRIAL AVAILABILITY

The composite according to the present invention provides a composite which can improve a working environment, has improved durability and strength, and is lightweight. Further, the composite according to the present invention is easily reused, and can have a variety of uses such as a vehicle interior or exterior material.

The invention claimed is:

1. A polyester composite, comprising:
a polyester foam sheet having a first surface and second surface;
a first polyester resin layer laminated on at least the first surface of the polyester foam sheet, wherein the polyester foam sheet has an average basis weight in a range of 500 to 850 g/m$^2$,
a polyester fiber layer laminated on the first polyester resin layer;
a first polyester-based adhesive resin layer interposed between the polyester foam sheet and the first polyester resin layer; and
a second polyester-based adhesive resin layer interposed between the first polyester resin layer and the polyester fiber layer;
wherein the polyester foam sheet has closed cells measured according to DIN ISO 4590 of 90% (v/v) or more among total cells,
wherein the polyester foam sheet has 1 to 30 cells per mm$^2$,
wherein the first polyester resin layer has an average thickness in the range of 60 to 350 µm,
wherein each of the first and second polyester-based adhesive resin layers is a polyester-based elastic adhesive resin which is a condensation-polymerization product of a hard segment which is an esterification reaction product of diol and dicarbonic acid and a soft segment which is a polyol,
wherein the polyester composite has a flexural strength of 20 N/cm$^2$ or more which is measured when a specimen is fixed with a 100 mm support span and a flexural load is applied thereto at a rate of 5 mm/min according to ASTM D 790,
wherein the polyester fiber layer is formed of an aggregate of modified cross section hollow fibers, each modified cross section hollow fiber includes a hollow part, a shape maintaining part and a volume control part on the basis of a cross-sectional shape, and the volume control part has a shape which protrudes in a direction opposite to a center of a fiber in which an end part has a round shape.

2. The polyester composite according to claim 1, wherein the polyester composite has a flexural modulus or stiffness of 400 MPa or more which is measured when a specimen is fixed with a 100 mm support span and a flexural load is applied thereto at a rate of 5 mm/min according to ASTM D 790.

3. The polyester composite according to claim 1, wherein the polyester composite does not include glass fiber.

4. The polyester composite according to claim 1, wherein the polyester composite has an average thickness in a range of 1.1 to 5.2 mm.

5. The polyester composite according to claim 1, further comprising a second polyester resin layer laminated on the second surface of the polyester foam sheet.

6. The polyester composite according to claim 1, wherein the polyester foam sheet has an average thickness in a range of 1 to 5 mm.

7. The polyester composite according to claim 1, wherein the polyester foam sheet has a flexural strength of 10 N or more which is measured when a specimen is fixed with a 100 mm support span and a flexural load is applied thereto at a rate of 5 mm/min according to ASTM D 790.

8. The polyester composite according to claim 1, wherein the polyester foam sheet is a polyethylene terephthalate (PET) foam sheet, and the first polyester resin layer is a polyethylene terephthalate resin layer.

9. The polyester composite according to claim 1, wherein the first polyester resin layer is a biaxially oriented polyester film which is stretched 2 to 8-fold in a longitudinal direction (a machine direction, MD) and stretched 1.1 to 6-fold in a transverse direction (a direction perpendicular to the machine direction, TD), and has a total draw ratio of 1.5 to 7-fold.

10. The polyester composite according to claim 1, wherein
the polyester fiber layer includes polyethylene terephthalate fibers.

11. A vehicle interior or exterior material comprising the polyester composite according to claim 1.

12. The vehicle interior or exterior material according to claim 11, wherein the vehicle interior or exterior material is one or more of a head liner, a flow under cover, an engine room cover, a trunk room panel, a package tray, a seatback and a bumper.

13. The vehicle interior or exterior material according to claim 11, wherein the vehicle interior or exterior material is a trunk room panel having a flexural modulus of 400 to 30,000 MPa which is measured when a specimen is fixed with a 100 mm support span and a flexural load is applied thereto at a rate of 5 mm/min according to ASTM D 790.

14. The vehicle interior or exterior material according to claim 11, wherein wherein the vehicle interior or exterior material is a head liner panel satisfying the following Condition 1:

$$((Lt_1 - Lt_0)/Lt_0) \times 100 < 1 (\%)$$ [Condition 1]

wherein Condition 1 represents a dimensional (an average value of a width, a length, and a height) change rate measured, according to an accelerated light-resistance test of KS R 0021, before and after being irradiated with light of a wavelength of 300 to 400 nm at an irradiance of 255 W/m² for 90 days, and $Lt_0$ represents the dimension before treatment and $Lt_1$ represents the dimension after treatment.

15. The polyester composite according to claim 5, wherein the polyester composite has a structure in which the second polyester resin layer; and a second polyester fiber layer are sequentially stacked on the second surface of the polyester foam sheet.

* * * * *